US011733861B2

United States Patent
Tadros et al.

(10) Patent No.: US 11,733,861 B2
(45) Date of Patent: Aug. 22, 2023

(54) INTERPRETING INPUTS FOR THREE-DIMENSIONAL VIRTUAL SPACES FROM TOUCHSCREEN INTERFACE GESTURES TO IMPROVE USER INTERFACE FUNCTIONALITY

(71) Applicant: Trimble Inc., Sunnyvale, CA (US)

(72) Inventors: Michael Tadros, Boulder, CO (US); Robert Banfield, Riverview, FL (US); Ross Stump, Thornton, CO (US); Wei Wang, Superior, CO (US)

(73) Assignee: Trimble Inc., Sunnyvale, CA (US)

( * ) Notice: Subject to any disclaimer, the term of this patent is extended or adjusted under 35 U.S.C. 154(b) by 0 days.

(21) Appl. No.: 17/100,512

(22) Filed: Nov. 20, 2020

(65) Prior Publication Data

US 2022/0164097 A1    May 26, 2022

(51) Int. Cl.
| | |
|---|---|
| *G06F 3/00* | (2006.01) |
| *G06F 3/04883* | (2022.01) |
| *G06N 20/00* | (2019.01) |
| *G06F 3/04815* | (2022.01) |
| *G06F 3/04842* | (2022.01) |

(52) U.S. Cl.
CPC ...... *G06F 3/04883* (2013.01); *G06F 3/04815* (2013.01); *G06F 3/04842* (2013.01); *G06N 20/00* (2019.01)

(58) Field of Classification Search
CPC ............ G06F 3/04883; G06F 3/04815; G06F 3/04842; G06N 20/00
See application file for complete search history.

(56) References Cited

U.S. PATENT DOCUMENTS

| | | | | |
|---|---|---|---|---|
| 7,216,305 | B1 * | 5/2007 | Jaeger | G06F 3/033 715/849 |
| 7,971,156 | B2 * | 6/2011 | Albertson | H04L 63/08 715/863 |
| 2009/0128486 | A1 * | 5/2009 | Nijlunsing | G06F 3/04847 345/157 |
| 2010/0149109 | A1 * | 6/2010 | Elias | G06F 3/04883 345/173 |
| 2011/0164029 | A1 * | 7/2011 | King | G06T 19/00 345/419 |

(Continued)

OTHER PUBLICATIONS

Extended European Search Report for Application No. 21208053.5-1224, dated Apr. 8, 2022, 8 pages.

*Primary Examiner* — Kieu D Vu
*Assistant Examiner* — Andrew Chung
(74) *Attorney, Agent, or Firm* — Kilpatrick Townsend & Stockton

(57) ABSTRACT

A user computing device displays a three-dimensional virtual space via a user interface. The user computing device detects a gesture input at a location of the user interface. The user computing device translates the gesture input into a user interface input by predicting, based on the gesture input, a design intended by the gesture input and mapping, based on the design and the location of the gesture input on the user interface, the design to the user interface to generate the user interface input. The user computing device executes, in response to the user interface input, an operation to add an object in the three dimensional virtual space. The user computing device renders an updated three dimensional space displaying the object.

17 Claims, 5 Drawing Sheets

(56) References Cited

U.S. PATENT DOCUMENTS

| | | | |
|---|---|---|---|
| 2012/0013613 A1* | 1/2012 | Vesely | H04N 13/30 345/419 |
| 2013/0194187 A1* | 8/2013 | Pasquero | G06F 3/04886 345/168 |
| 2014/0104206 A1* | 4/2014 | Anderson | G06F 3/041 345/173 |
| 2014/0143733 A1* | 5/2014 | Jung | H04N 13/398 715/848 |
| 2015/0084936 A1* | 3/2015 | Bae | G06F 3/0488 345/179 |
| 2016/0110052 A1* | 4/2016 | Kim | G06F 3/0488 345/173 |
| 2017/0109032 A1* | 4/2017 | MéLinand | G06F 40/171 |
| 2017/0109578 A1* | 4/2017 | Bednarowicz | G06V 30/387 |
| 2018/0045963 A1* | 2/2018 | Hoover | G06F 3/013 |
| 2019/0073119 A1* | 3/2019 | Zeevi | G06F 3/0412 |
| 2019/0114831 A1* | 4/2019 | Singh | G06F 3/011 |
| 2019/0392587 A1* | 12/2019 | Nowozin | G06T 7/75 |
| 2020/0150771 A1* | 5/2020 | Giusti | G06F 3/017 |
| 2021/0173046 A1* | 6/2021 | Regani | G01S 13/003 |

* cited by examiner

200
Interpreting a user interface input for a three-dimensional virtual space from a user touchscreen gesture

210
Displaying, via an application, a three-dimensional virtual space via a user interface of the user computing device

220
Detecting, via an application, a gesture input via the user interface

230
Transmitting, by the application, a representation of the gesture input to a machine learning component

240
Determining, via the machine learning component, a design intended by the gesture input and proportions of the intended design

250
Generating, by the machine learning component, output coordinates comprising the intended design

260
Mapping, by the application based on the output coordinates, the intended design to the user interface to determine a user interface input

270
Executing a command corresponding to the intended user interface input with respect to the three-dimensional virtual space

280
Rendering, by the application, an updated three dimensional space for display via the user interface

*Fig. 2*

INTERPRETING INPUTS FOR THREE-DIMENSIONAL VIRTUAL SPACES FROM TOUCHSCREEN INTERFACE GESTURES TO IMPROVE USER INTERFACE FUNCTIONALITY

TECHNICAL FIELD

This disclosure generally relates to applying user interface gesture inputs in mobile device applications. More specifically, but not by way of limitation, this disclosure relates to interpreting a user interface input for a three-dimensional virtual space from a user interface gesture.

BACKGROUND

Computing devices with user interfaces, such as touchscreen user interfaces, virtual reality ("VR") user interfaces, or other user interfaces that receive or otherwise detect physical contacts with the user interface or motion of users, are convenient but may not be practical for use with certain applications that require users to execute precise inputs to perform desired operations. For example, drawing or drafting programs require precise placement, orientation, and dimensions of objects to generate useful work products. Users may be unable to practically execute the necessary user inputs via such user interfaces because of lack of coordination or because a size of the user interface is too small to feasibly execute the gesture input at a required precision using a finger or a stylus. For example, in conventional drawing programs, since it may not be feasible to support natural or intuitive gesture inputs, users may need to learn special gestures to generate a design (e.g. gesturing to select a center of a circle and then drawing a line extending from the center to define the radius of the circle) that is not as intuitive as a natural gesture for drawing the same design (e.g. indicating the perimeter of a circle with a gesture input). Also, users may have difficulty executing gesture inputs at desired locations on the user interface and executing complex gestures with precise dimensions or orientations (e.g. drawing a perfect square with right angles and straight sides, drawing an exact circle having a consistent radius at every point along the circle). Further, drawing programs designed for mobile computing devices may lack extensive menu options with special operations (e.g. operations to draw a window, a door, or other special shape) that are available on corresponding programs designed for use with a laptop or desktop computing device.

SUMMARY

Certain embodiments involve interpreting a user interface input for a three-dimensional virtual space from a user interface gesture, according to certain embodiments described in the present disclosure. A user computing device displays a three-dimensional virtual space via a user interface. The user computing device detects a gesture input at a location of the user interface. The user computing device translates the gesture input into a user interface input by predicting, based on the gesture input, a design intended by the gesture input and mapping, based on the design and the location of the gesture input on the user interface, the design to the user interface to generate the user interface input. The user computing device executes, in response to the user interface input, an operation to add an object in the three dimensional virtual space. The user computing device renders an updated three dimensional space displaying the object.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts an example of a method for interpreting a user interface input for a three-dimensional virtual space from a user interface gesture, according to certain embodiments described in the present disclosure.

DETAILED DESCRIPTION

Figure 1:
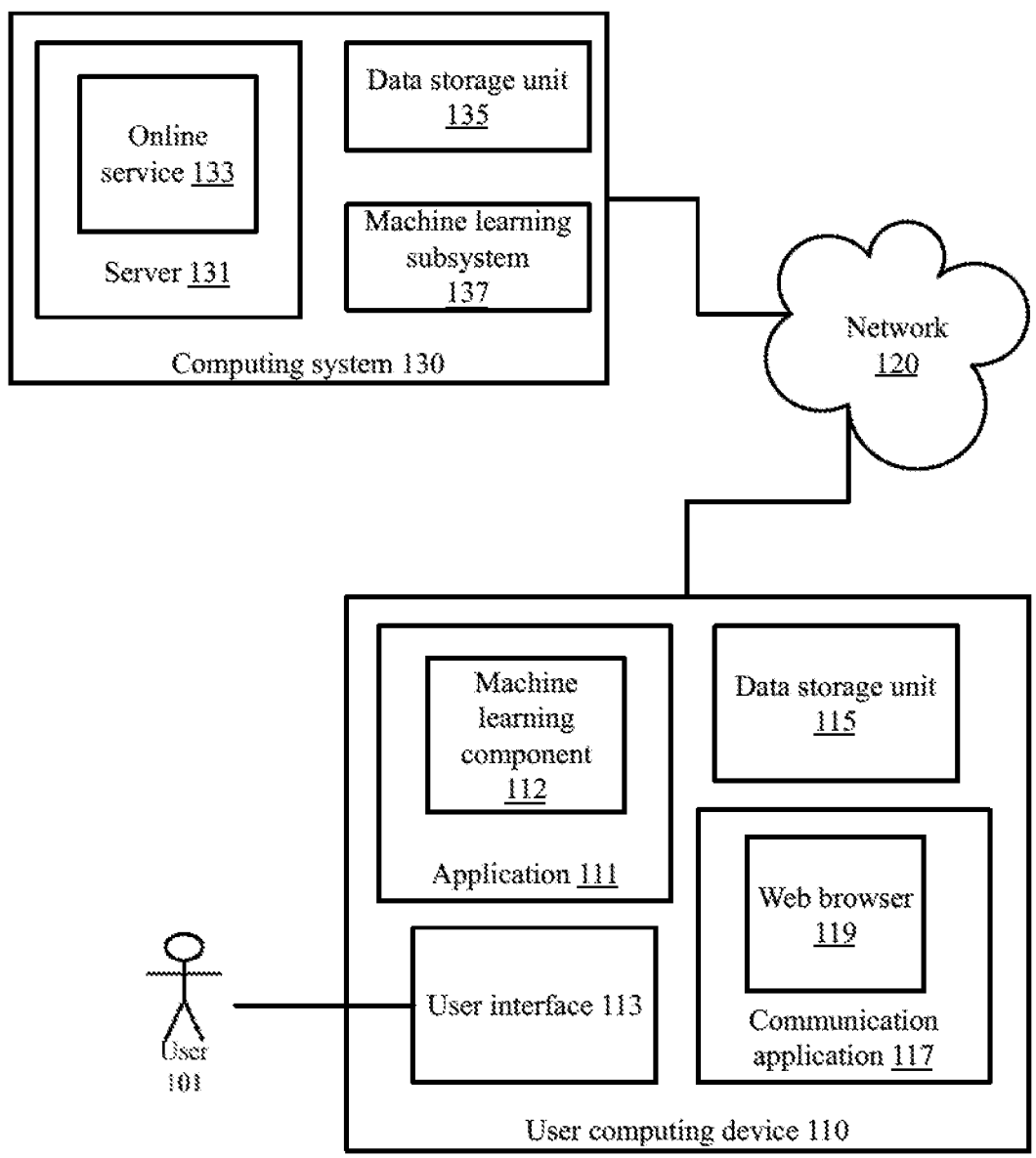
FIG. 1 depicts an example of a computing environment for interpreting a user interface input for a three-dimensional virtual space from a user interface gesture, according to certain embodiments described in the present disclosure.

The present disclosure involves interpreting a user interface input for a three-dimensional virtual space from a user interface gesture. For instance, as explained above, conventional computer programs designed for use on mobile devices lack comprehensive operation menus and users have difficulty providing precise gesture inputs to such computer programs via user interfaces on such mobile devices, for example, via touchscreen user interfaces, virtual reality ("VR") user interfaces, or other user interfaces that accept contact of the user with the user interface or detect motion of the user as input. Accordingly, conventional mobile device platforms are not able to translate a user's intent (as indicated by the user's gesture input) into adequate outputs, thereby decreasing the ease of use for users for mobile device applications requiring precise outputs (such as drawing applications where the user introduces objects or manipulates objects in a three-dimensional virtual space). Additionally or alternatively, increasing menu options and special input operations in an application on a mobile platform could lead to user confusion as such menus may not be easily navigable using a touch screen interface and users may prefer a simple user interface that is not cluttered with complex menus and tools. Further, it is not realistic to expect users to execute extremely precise gesture inputs (e.g. drawing a perfect circle) via a user interface using a finger or a stylus. Such an expectation may frustrate users and cause users to lose interest in the mobile application as the mobile application is not able to translate a user's intent into a desired output using the provided gesture input. Further, conventional mobile application platforms may choose not to design applications that support natural or intuitive gesture inputs due to the precision required for executing such inputs and instead support gesture inputs that require less precision but that are not natural or intuitive, which increases the burden of learning for the user.

Certain embodiments described herein can avoid one or more of these problems by, for example, incorporating a machine learning model into an application to enable the application to determine an intended user interface input from an executed user gesture input and then apply the intended user interface input. The translation of an imprecisely executed user gesture input into a precise user interface input using a machine learning model allows for feasible usage of mobile computing device platforms for applications requiring precise inputs without causing frustration to the user and without requiring the addition of menu options that may not be preferred by users or feasible to provide in a mobile computing device platform. Further, using the machine learning model enables a mobile application to support or otherwise increases the feasibility of supporting natural drawing inputs since the user is aided in drawing a precise user interface input using a user gesture input that would otherwise not be sufficiently precise without the aid of the machine learning model.

The following non-limiting example is provided to introduce certain embodiments. A user computing device application displays a three-dimensional virtual space via a user interface of the user computing device. The application enables a user to create and manipulate objects in a virtual three-dimensional space. For example, the application may be a drawing application that enables a user to create virtual environments including objects of nature, buildings, and other items generated by the user. The user may access the application via the user interface and create a new three-dimensional virtual space or open an existing three-dimensional virtual space.

The application detects a gesture input via the user interface. For example, the user desires to add an object to the displayed three-dimensional virtual space using a gesture input via the user interface. The gesture input could be one or more taps, swipes, or other touch contact or combination of touch contacts of one or more fingers of the user or other peripheral(s) manipulated by the user (e.g. a stylus designed for use with touch screen interfaces). In another example, the gesture input could be one or more detected motions of the user (e.g. waving a hand) in 3-D space. In yet another example, the gesture input could be a detected manipulation of a tool that is communicatively coupled to the user interface (e.g. a user clicking and dragging a mouse to draw a shape in the user interface). The object that the user desires to add could be a three-dimensional shape (e.g. a cylinder, a cube, a sphere, a pyramid), a pre-configured object design stored on the user computing device and relevant to a context of the three-dimensional virtual space (e.g. a door, a window, a tree, a table), or a pre-configured object design that the application may look up by communicating with a remote server. The user may also intend that the desired object have particular dimensions and a particular placement, rotation, or other configuration within the three-dimensional virtual space. For example, the user desires that a pre-configured object (e.g. a roof) be added above an existing object (e.g. the perimeter walls of a building). The user attempts a gesture input that could be a single gesture or combination of gestures via the user interface to direct the application to add the object (or objects) to the three-dimensional virtual space. Further, the user may attempt to communicate one or more of desired dimensions, a desired location, and a desired orientation of the object in the three-dimensional virtual space via the same gesture input. Particular gestures or combinations of gestures may be known to the user to be associated with adding desired shapes or preconfigured objects, communicating desired dimensions (e.g. length, width, height) of the object, communicating a desired position for the object in virtual space, communicating a desired orientation of the object within the virtual space, or other desired features of the object.

The application transmits a representation of the gesture input to a machine learning component. The machine learning component determines an intended design from the representation of the gesture input and proportions of the intended design. The application may log a representation of the gesture input that tracks where on the touch screen user interface the gesture input was received. For example, the user provides a gesture input by touching a peripheral (e.g. a stylus) to the user interface and dragging the peripheral to draw a drawing, shape, or image on the user interface (e.g. the user draws a square by hand with the stylus). The user interface detects the gesture input (e.g. the user interface comprises a capacitive touch screen that detects a contact of a peripheral or of a finger of the user against the user interface) and the application logs a representation of the gesture input as drawn by the user on the user interface. The representation includes information describing the shape, drawing, or image drawn by the user via the gesture input with respect to the user interface. In certain examples, bounds of the representation are less than or equal to bounds of the user interface and the representation is defined in units of pixels that correspond to pixels or other subdivisions of the user interface. In some examples, the information in the representation describes the shape, drawing, or image drawn by the user within the bounds of the user interface in terms of pixel values (e.g. shaded pixels that are in a path of the gesture input and unshaded pixels that are not in the path of the gesture input). The representation may comprise an image file (e.g., JPEG, PNG) or a matrix of pixel values. In some examples, the representation describes a two-dimensional gesture input (e.g. for a touchscreen input) while in other examples (e.g. for a gesture input in a virtual reality environment) the representation describes a three-dimensional gesture input. The representation of the user's gesture input is stored on a data storage unit of the user computing device or on a data storage unit that is otherwise accessible to the user computing device. The application may further store a representation of the three-dimensional virtual space as displayed via the user interface at the time when the gesture input was received via the user interface so that the application can recall where the gesture input was received relative to the three-dimensional virtual space displayed via the user interface at the time the gesture input was received.

The machine learning component generates design coordinates comprising an intended design. For example, the user intends to draw a gesture input with square dimensions but executes a gesture input that comprises a crudely drawn square with one or more irregularities such as sides not being straight, sides not being the same length, all angles not being 90 degrees, or lines protruding past vertices of the square. The machine learning model would predict what the user intended to draw based on the user gesture input. In an example, the machine learning component comprises a convolutional neural network that is trained using labeled training data associated with known designs to generate, from the representation of a gesture input, design coordinates that describe a design that was intended by the user that provided the gesture input. A preprocessor receives the representation of the gesture input as an image, or matrix of pixel values, and generates a rescaled, reshaped image matrix. The input image matrix indicates a 3-channel color value for each pixel in an image of the gesture input (e.g. whether the pixel is in the path of the gesture input or not in the path of the gesture input). The model applies the trained convolutional neural network to the input image matrix to recognize features of the image and predicts output coordinates of possible shapes in the representation. The machine learning model determines an affinity score of the image input matrix with respect to each of the possible shapes and generates a design label for a design (e.g. a square, a square with a line extending from the center of the square, a square with circle inside of the square) corresponding to a particular possible shape having a highest affinity score of the set of possible shapes. In some examples, the affinity scores are normalized to fall within a range of zero and one. The greater the affinity score, the greater the likelihood that the respective possible shape accurately describes the representation of the gesture input (that is represented by the image input matrix). The machine learning model, in accordance with stored model dimensions associated with the design label, provides design coordinates which indicate intended dimensions, intended orientation, or other features of the design intended by the user based on the data in the image input matrix. The machine learning model provides an output comprising the design coordinates. The design coordinates may indicate the intended design with respect to bounds of the received representation of the user gesture input. For example, design coordinates for a square could comprise two or more points defining two or more respective vertices for the square and design coordinates for a circle could include a center point and a radius of the circle or two opposite points on the circle defining a diameter.

The application maps the intended design to the user interface to determine a user interface input based on the design coordinates output by the machine learning model. In an example, the gesture input is a rough sketch of a square and the user interface input based on the output design coordinates is a perfect square. In this example, the machine learning model predicted, using the gesture input as input data, the perfect square as the intended design and generated design coordinates enabling the application to map the perfect square to the user interface to generate the user interface input. The application determines a location on the user interface for the user interface input, for example, that corresponds to where on the user interface the gesture input was received based on the representation of the gesture input and then maps the intended design to the user interface using the design coordinates to generate the user interface input.

The application executes an operation corresponding to the user interface input to apply to the three-dimensional virtual space. The user interface input is the input intended by the user that executed the gesture input. The application may access a database or other information structure that lists operations associated with user interface inputs to determine an operation to execute in response to the user interface input. The application retrieves a display of the three-dimensional virtual space associated with the representation of the gesture input. The application overlays or otherwise compares the design coordinates describing the intended design to the user interface to determine the user interface input. The application also determines a location for the user interface input based on the location associated with the received gesture input. The application treats the user interface input as if it were directly input by the user to the user interface instead of the gesture input. The application executes an operation associated with the user interface input with respect to the three-dimensional virtual space displayed at the time the gesture input was received. For example, the user interface input comprises a design of a square drawn on the user interface with a line projecting from the center of the square and the operation associated with the design instructs the application to draw a rectangular prism in the three-dimensional virtual space having a length corresponding to the length of the projecting line and a width and height corresponding to the dimensions of the square. If the location of the user interface input is within a threshold distance to an existing object, the operation may specify that the added object be placed adjacent to, on top of, below, or otherwise connected to the existing object. For example, the user executes a gesture input at a location within a threshold distance to a top of a table object and the application determines a user interface input from the gesture input and executes an operation to generate a birthday cake object that is on top of a surface of the table object.

The application renders an updated three-dimensional virtual space for display via the user interface. The application displays the updated three-dimensional virtual space with the object added to the three-dimensional virtual space in accordance with an executed operation associated with the user interface input. For example, the application generates the object that the user intended when entering the gesture input.

In some embodiments, instead of intending to add an object to a three-dimensional virtual space, the user intends to modify one or more features (e.g. an orientation, a rotation, a color, a size, or other feature) of an object within the three-dimensional virtual space. In these embodiments, the operation associated with the user interface input modifies the one or more features of the existing object in the three-dimensional virtual space. In some embodiments, the user selects an object displayed in the three-dimensional virtual space and then inputs one or more gesture inputs to modify the one or more features of the displayed object.

Certain embodiments provide improvements to computing systems by interpreting a user interface input for a three-dimensional virtual space from a gesture input. These improvements can be effected by applying a machine learning model to a representation of the gesture input to predict an intended design, which can be mapped to the user interface to determine a user interface input. Applying the machine learning model to predict an intended design of the user based on the user gesture input and then mapping the intended design to the user interface to determine the user interface input can improve user interface performance by decreasing the precision of a gesture input required to provide an interpretable user interface input that results in an appropriate output. In some embodiments, these improvements can facilitate improvements to computing system environments, particularly the performance of a user interface, by requiring fewer user interface inputs to define an object to be generated in a three-dimensional virtual space. For example, the methods described herein enable multiple features of an object (e.g. object type, size, location within the 3-D virtual space) to be defined in a gesture input instead of conventional methods requiring selection of multiple menu options in addition to a gesture input. For example, instead of a user selecting an object type using one or more inputs to a menu on the user interface then additionally performing one or more inputs to generate the object on the user interface, as required in conventional systems, the methods described herein enable a user to communicate object type and a command to generate the object in the user interface based on one or more aspects of the intended design derived solely from a gesture input. Accordingly, the embodiments described herein utilize machine learning models to improve computing system performance, particularly the performance of user interfaces.

In some embodiments, the user interface comprises a touchscreen user interface and the gesture input comprises one or more contacts (e.g. taps, swipes) of the user (e.g. finger) or of a peripheral (e.g. a stylus) manipulated by the user. In other embodiments, the user interface comprises a virtual reality user interface and the gesture input comprises a motion input of the user (e.g. the user waves one or more hands in a three dimensional path) detected by a motion detector component of the user computing device or a motion detector device otherwise communicatively connected to the user computing device. In other embodiments, the gesture input comprises a click and drag or other action of a mouse or other device that is communicatively coupled to the user computing device and enables the user to provide the gesture input.

As used herein, the terms "gesture input," "user gesture input," or "gesture," are used to refer to one or more inputs to a user interface of a user computing device resulting from a contact of a user (e.g. a finger) or peripheral (e.g. a stylus) with the user interface and/or one or resulting from motion of the user (e.g. waves of the user's hand) detected by the user computing device or by a motion detection device communicatively coupled to the user computing device. In an example, the gesture input may comprise one or more physical contacts (e.g. taps, swipes) received via the user interface. In another example, the gesture input may comprise one or more motions of the user detected by the user computing device or by a device communicatively coupled to the user computing device. The one or more physical contacts or motions of the gesture input may be simultaneous or sequential. In an example, a gesture input comprises a doodle or drawing of the user indicated via contact of a hand (or other part of the body) or peripheral of the user with a touchscreen user interface or indicated via motion of a hand (or other part of the body) or peripheral in 3-D physical space as detected by a motion detection device.

As used herein, the terms "design" or "intended design" or "predicted design" are used to refer to a design predicted by a machine learning model. The machine learning model predicts the intended design using a representation of the touchscreen gesture as input.

As used herein, the term "design coordinates" is used to refer to information associated with the intended design that enables an application or other computing system to map the intended design to the user interface to determine a user interface input.

As used herein, the term "user interface input" describes an input to the user interface to generate, add, or otherwise manipulate objects in a displayed virtual three-dimensional space. The user interface input is determined by mapping the intended design predicted by the machine learning model (determined based on the gesture input) to the user interface using design coordinates generated by the machine learning model.

Example of an Operating Environment for Interpreting a User Interface Input for a Three-Dimensional Virtual Space from a User Touchscreen Gesture Referring now to the drawings, FIG. 1 depicts an example of a computing environment 100 for interpreting a user interface input for a three-dimensional virtual space from a user gesture, according to certain embodiments described in the present disclosure. In some embodiments, the computing environment 100 includes a user computing device 110 and a computing system 130.

In the example depicted in FIG. 1, a user computing device 110 communicates with a computing system 130 via a data network 120. In some embodiments, the user computing device 110 receives services from the computing system 130. For instance, an online service 133 provided by the computing system 130 communicates data, stores data, processes one or more requests, or otherwise provides services to the user computing device 110. In some embodiments, each of the user computing 110 and the computing system 130 perform one or more steps illustrated in FIG. 2 and described herein and communicate via a network 120. In other embodiments, the user computing device 110 alone performs the steps illustrated in FIG. 2 and described herein without communicating with a computing system 130 via a network 120.

In examples described herein, the user computing device 110 executes an application 111 that displays a three-dimensional virtual space to a user 101 via a user interface 113 of the user computing device 110 and allows the user 101 to create, move, rotate, or otherwise edit one or more features of objects within the three-dimensional virtual space by providing inputs via the user interface 113. In certain examples, one or more functions described as being performed by the application 111 may instead be performed via the web browser 119, which communicates with the online service 133 via the network 120.

In this example, the user computing device 110 includes an application 111 (including a machine learning component 112), a user interface 113, a data storage unit 115, a communication application 117, and a web browser 119.

The application 111 enables a user 101 to create and manipulate objects in a virtual three-dimensional space. For example, the application 111 may be a drawing application that enables a user to create virtual environments including objects of nature, buildings, and other items generated by the user 101 for various purposes such as designing buildings, scenes of nature, video game environments, or other appropriate purposes. The user 101 may access the application via the user interface 113 and create a new three-dimensional virtual space or open an existing three-dimensional virtual space saved in a data storage unit 115 of the user computing device 110. The user 101 may add objects to the virtual space and/or manipulate objects within the virtual space. The application stores a computer program code representation of the virtual three-dimensional space along with any objects in the three-dimensional virtual space and features associated with the objects (e.g. color, dimensions, position within the three-dimensional virtual space, orientation, etc.) in the data storage unit 115. The application 111 detects one or more gesture inputs received via the user interface 113 and generates a representation of the one or more received gesture inputs input by the user 101. The application 111 determines an intended design based on the representation of the one or more received gesture inputs by applying an image recognition model. For example, the application 111 executes a machine learning component 112, which generates design coordinates for an intended design using the one or more received gesture inputs as input to an image recognition model. An example image recognition model comprises a convolutional neural network. The application 111 trains the image recognition model using a set of training data and known ground truth values. The application 111 trains the image recognition model according to one or more hyperparameters to minimize one or more loss functions over successive iterations of the image recognition model during a training period. The application 111 receives design coordinates of an intended design from the machine learning component 112 and determines a user interface 113 input based on the design coordinates. The application 111 may map the intended design to the user interface 113 using the design coordinates to generate a user interface 113 input and execute an operation corresponding to the user interface 113 input with respect to the three-dimensional virtual space. The application 111 renders an updated three-dimensional space for display via the user interface 113 including the object added to the three-dimensional virtual space via the user interface 113 input.

In certain examples, the application 111 communicates with a computing system 130 via the network 120. For example, the application 111 may communicate with an online service 133 via a server 131. In some examples, one or more functions described herein as performed by the application 111 may be performed by the online service 133 of the computing system 130. In certain examples, one or more functions described herein as performed by the application 111 may instead be performed by a web browser 119 application that communicates with the computing system 130.

An example machine learning component 112 comprises a machine learning model that receives a representation of a user gesture input to the user interface 113 and predicts a design intended by the gesture input and proportions of the intended design. For example, the user 101 draws a shape on the user interface 113 that resembles a two centimeter by two centimeter square but does not have ninety-degree angles and the last side of the shape as drawn extends past one of four vertices. In an example, the machine learning component 112 is a trained image recognition model that determines, based on a representation of the user gesture input, that the user intended to draw a two centimeter by two centimeter square and outputs a design comprising a perfect two centimeter by two centimeter square. In other examples, instead of the machine learning component 112 of the user computing device application 111 applying this image recognition model, a machine learning subsystem 137 communicates with the application 111 via the network 120 and applies the image recognition model to determine an intended design based on a representation of the user 101 gesture input.

The user interface 113 receives or otherwise detects a contact or motion of the user 101 and enables the user 101 to provide input to the application 111. The user interface 113 may comprise a touchscreen user interface, a VR user interface, a motion detection user interface, a user interface 113 that receives input based on user 101 manipulation of a device (e.g. a computer mouse) that is communicatively coupled to the user interface 113, or other user interface 113 that can detect a contact or motion of the user 101. The user 101 accesses the application 111 and creates a new three-dimensional virtual space or otherwise accesses a saved three-dimensional virtual space by actuating one or more user interface objects on the user interface 113. The user interface 113 displays the three-dimensional virtual space associated with the application 111. The user 101 may provide one or more gesture inputs to the application 111 using a finger, stylus, or other peripheral. The user 101 enters the one or more gesture inputs to instruct the application 111 to add a virtual object to the three-dimensional virtual space. For example, the gesture inputs include one or more contact inputs at the user interface 113, for example, touching or dragging a stylus across the user interface 113. The user interface 113 communicates with the application 111 to log the one or more gesture inputs so that the application 111 can generate a representation of user gesture inputs received via the user interface 113. The user interface 113 receives instructions from the application 111 to display an object in the three-dimensional virtual space in accordance with a user interface 113 input that is determined based on an intended design predicted via a machine learning model from the one or more gesture inputs received via the user interface 113.

The data storage unit 115 is accessible to the application 111. The data storage unit 115 may store computer code representations of three-dimensional virtual spaces generated by a user 101. In some examples, the data storage unit 115 stores training data and hyperparameters information used to train the machine learning component 112 to recognize intended designs from representations of user gestures received via the user interface 113. In some examples, the data storage unit 115 is accessible to the computing system 130 via the network 120. In some examples, one or more functions described herein as performed by the data storage unit 115 may be performed by a data storage unit 135 of the computing system 130. Accordingly, in some examples, the data storage unit 135 stores training data and hyperparameters information used by the computing system 130 to train the machine learning model and the user computing device 110 receives the trained machine learning model as the machine learning component 112 of the application 111 when downloading the application 111 via the network 120. An example of a data storage unit 115 includes a local or remote data storage structure accessible to the user computing device 110 suitable for storing information. A data storage unit can store relevant data as one or more databases, one or more matrices, computer code, etc.

The user 101 can use the web browser application 119, or the application 111, to view, download, upload, or otherwise access documents or web pages via a network 120. The communication application 117 can interact with web servers or other computing devices connected to the network 120, including the server 131 of the computing system 130.

The computing system 130 executes one or more software modules that implement one or more online services (e.g., online service 133). In this example, the computing system 130 includes a server 131, an online service 133 and a machine learning subsystem 137. The computing system 130 also includes one or more data storage units 135.

The server 131 provides content to the user computing device 110 accessed through the application 111 or the web browser 119, including but not limited to html documents, images, style sheets, and scripts. In an example, the server 131 supports the online service 133. In some examples, the server 131 supports the machine learning subsystem 137.

The online service 133 may be associated with the application 111. In an example, an application 111 resident on the user computing device 110 is associated with the computing system 130 and communicates with the computing system 130 to access the online service 133. In an example, the user 101 accesses the online service 133 via the network 120 using a web browser 119 and downloads the application 111 to the user computing device 110 via the network 120. The online service 133 may perform one or more functions described herein as being performed by the application 111 (including the machine learning component 112) and/or the web browser 119 application. The online service 133 may perform one or more functions described herein as being performed by the machine learning subsystem 137. In some embodiments, the online service 133 comprises the machine learning subsystem 137.

The data storage unit 135 could store computer code representations of three-dimensional virtual spaces generated by a user 101. An example of a data storage unit 135 includes a local or remote data storage structure accessible to the computing system 130 suitable for storing information. A data storage unit can store relevant data as one or more databases, one or more matrices, computer code, etc. The data storage unit 135 may store training data and hyperparameters information used to train a machine learning subsystem 137 of the computing system 130 (or the machine learning component 112 of the user computing device 110) to recognize intended designs from representations of user gestures received via the user interface 113. In some examples, the data storage unit 135 is accessible to the user computing device 110 via the network 120. In some examples, one or more functions described herein as performed by the data storage unit 135 may be performed by a data storage unit 115 of the user computing device 110.

In some embodiments, the machine learning subsystem 137 includes a machine learning model that receives a representation of a user gesture input to the user interface 113 and predicts a design intended by the gesture input and proportions of the intended design. For example, the user 101 draws a shape on the user interface 113 that resembles a two centimeter by two centimeter square but does not have ninety-degree angles and the last side of the shape as drawn extends past one of four vertices. In an example, the machine learning subsystem 137 is a trained image recognition model that determines, based on a representation of the user gesture input, that the user intended to draw a two centimeter by two centimeter square and outputs a design comprising a perfect two centimeter by two centimeter square. In other examples, instead of the machine learning subsystem 137 of the computing system 130 applying this image recognition model, a machine learning component 112 of an application 111 applies the image recognition model to determine an intended design based on a representation of the user 101 gesture input.

In the examples described herein, the machine learning subsystem 137 and the online service 133 are separate components of the computing system 130 executing separate functions. In some embodiments, however, one or more of the functions described herein as being performed by the machine learning subsystem 137 are performed by the online service 133. In some embodiments, one or more of the functions described herein as being performed by the online service 133 are performed by the machine learning subsystem 137.

One or more of the user computing device 110 and the computing system 130 could include a device having a communication module capable of transmitting and receiving data over a data network 120. For instance, one or more of the user computing device 110 and the computing system 130 could include a server, a desktop computer, a laptop computer, a tablet computer, a television with one or more processors embedded therein and/or coupled thereto, a smart phone, a handheld computer, or any other wired or wireless, processor-driven device. For example, the computing system 130 includes the server 131 and the user computing device includes the application 111 and/or communication application 117 and web browser 119.

Examples of the data network 120 include, but are not limited to, internet, local area network ("LAN"), wireless area network, wired area network, wide area network, and the like. For example, the data network 120 includes a wired or wireless telecommunication means by which network systems can communicate and exchange data. For example, each data network 120 can be implemented as, or may be a part of, a storage area network ("SAN"), a personal area network ("PAN"), a metropolitan area network ("MAN"), a LAN, a wide area network ("WAN"), a wireless LAN ("WLAN"), a virtual private network ("VPN"), an intranet, an Internet, a mobile telephone network, a card network, a Bluetooth network, a Bluetooth low energy ("BLE") network, a Wi-Fi network, a near field communication ("NFC") network, any form of standardized radio frequency, or any combination thereof, or any other appropriate architecture or system that facilitates communication of signals, data, and/or messages (generally referred to as data). It should be understood that the terms "data" and "information" are used interchangeably herein to refer to text, images, audio, video, or any other form of information that can exist in a computer-based environment.

Examples of Operations for Interpreting a User Interface Input for a Three-Dimensional Virtual Space from a User Touchscreen Gesture FIG. 2 depicts an example of a method 200 for interpreting a user interface 113 input for a three-dimensional virtual space from a user 101 touchscreen gesture, according to certain embodiments. For illustrative purposes, the method 200 is described with reference to the components illustrated in FIG. 1, though other implementations are possible. For example, the program code for the application 111 (including the machine learning component 112), which is stored in a non-transitory computer-readable medium, is executed by one or more processing devices to cause the user computing device 110 to perform one or more operations described herein. For example, the program code for one or more of the online service 113 and the machine learning subsystem 137, which is stored in a non-transitory computer-readable medium, is executed by one or more processing devices to cause the computing system 130 to perform one or more operations described herein.

At block 210, the method 200 involves the user computing device 110 displaying, via the application 111, a three-dimensional virtual space via the user interface 113. In an example, the user 101 selects one or more objects on the user interface 113 (e.g. user interface icons) to access the application 111 via the user computing device 110. The user 101 may select an option to create a new three-dimensional virtual space or may open a previously generated three-dimensional virtual space. For example, the user 101 may navigate one or more menus or select one or more user interface 113 objects to create or access the three-dimensional virtual space. In response to receiving a user 101 input via the user interface 113, the application 113 generates a new three-dimensional virtual space or accesses a previously saved three-dimensional virtual space from a data storage unit 115.

At block 220, the method 200 involves the user computing device 110 detecting, via the application 111, a gesture input via the user interface 113. In an example, the user 101 desires to add an object to the three-dimensional virtual space displayed via the user interface 113. The object that the user 101 desires to add could be a three-dimensional shape (e.g. a cylinder, a cube, a sphere, a pyramid), a pre-configured object design stored on the user computing device 110 and relevant to a context of the three-dimensional virtual space (e.g. a door, a window, a tree, a table), or a pre-configured object design that the application 111 may look up by communicating with a remote server 131. The user 101 may also intend that the desired object have particular dimensions and a particular placement, rotation, or other configuration within the three-dimensional virtual space. Further, the user 101 may intend to communicate one or more of desired dimensions, a desired location, and a desired orientation of the object in the three-dimensional virtual space via the gesture input. Particular gesture inputs or combinations of gestures may be known to the user 101 to be associated with adding desired shapes or preconfigured objects, indicating desired dimensions of the object, indicating a desired position for the object in virtual space, indicating a desired orientation the object within the virtual space, or indicating one or more other features of the object. The user 101 executes one or more gestures by using a finger or peripheral e.g. a stylus) to touch the user interface. Examples of gestures could be dragging a finger or stylus across the user interface 113 in one or more touches, taps, strokes, glides, or other physical contact to the user interface 113. In another example, the user interface 113 receives a gesture comprising a motion of the user or of a peripheral detected in physical space. For example, the user 101 may input a gesture via the user interface 113 by attempting to draw a line, a curve, a shape such as a circle or a square, or a combination of lines, shapes, and/or curves through physical contact with the user interface 113 or through motion of the user's 101 body (e.g. the user waving a hand in the shape of a circle) or other peripheral through physical space that is detected by the user computing device 110 or by a motion detection device that is communicatively coupled to the user computing device 110. In other examples, the user 101 first selects a user interface 113 object to enable an input of a gesture and then inputs the gesture via the user interface 113.

At block 230, the method 200 involves the user computing device 110 transmitting, via the application 111, a representation of the gesture input to the machine learning component 112. The user computing device 110 detects the gesture inputs of the user 101. For example, the user computing device 110 comprises a capacitive touch screen user interface 113 that detects a gesture input comprising a contact of a peripheral or of a finger of the user against the user interface. In another example, the user computing device 110 comprises a 3-D movement detection user interface 113 comprising one or more motion sensors that detect a gesture input comprising a movement of a peripheral or appendage (e.g. an arm) of the user through 3-D space. In yet another example, the user computing device 110 is communicatively coupled to an input device (e.g. a mouse) and detects a gesture input comprising one or more user interactions with the input device (e.g. a click, a movement, a click with a concurrent movement). The application 111 receives the detected gesture inputs of the user 101 and generates a representation of the gesture inputs. The application 111 logs a representation of the gesture input that tracks where on the capacitive touch screen user interface 113 the gesture input was received. In another example, the application 111 logs a representation based on outputs of one or more motion sensors describing one or more movements of the user (e.g. a movement of an arm of the user) within a physical 3-D space. In yet another example, the application 111 logs a representation of the gesture input that tracks one or more interactions (e.g. a click and drag) of an input device (e.g. a mouse) with respect to the user interface 113. For example, the application 111 logs a position of a cursor on the user interface 113 as the user clicks and drags the mouse device that is communicatively coupled to the user computing device 110. The application 113 generates a drawing file comprising a representation of the gesture input drawn by the user 101 via the user interface 113. The representation includes information describing a shape, a drawing, or an image drawn by the user within the bounds of the user interface 113 in terms of pixel values (e.g. shaded pixels that are in a path of the gesture input and unshaded pixels that are not in the path of the gesture input). In certain examples, bounds of the representation are less than or equal to the bounds of the user interface 113 and the representation is defined in units of pixels that correspond to pixels or other subdivisions of the user interface 113 corresponding to where the gesture input was received. The representation could be an image file or a matrix of pixel values. Examples of drawing files include JPEG and PNG files. In an example, the application 111 inputs the representation of the user 101 gesture input to a machine learning model that predicts an intended design of the user 101.

At block 240, the method 200 involves the user computing device 110 determining, via the machine learning component 112, a design intended by the gesture input and proportions of the intended design. In an example, the machine learning component 112 receives the representation of the user 101 gesture input and predicts, using the trained machine learning model, design coordinates describing an intended design based on the representation of the user 101 gesture input. In an example, the machine learning component comprises a convolutional neural network that is trained using labeled training data associated with known designs to generate, from the representation of a gesture input, design coordinates that describe a design that was intended by the user that provided the gesture input. In some examples, a preprocessor receives the representation of the gesture input as an image, or matrix of pixel values, and generates a rescaled, reshaped image matrix. For example, the machine learning component is configured to predict design coordinates for representations of a specific size (e.g. a representation describing n×m pixels). In some examples, the application 111 resizes the representation of the user 101 gesture input as part of generating the rescaled, reshaped image matrix based on the resized representation. In some examples, the application 111 reshapes a three-dimensional representation (for example, a representation based on a logged user gesture input received via a VR user interface 113) into a two-dimensional representation as part of generating the rescaled, reshaped image matrix. In some examples, the preprocessor converts the representation of the user gesture input that is in the form of an image file into the input image matrix. The input image matrix indicates a 3-channel color value for each pixel in an image of the gesture input (e.g. whether the pixel is in the path of the gesture input or not in the path of the gesture input). The model applies the trained convolutional neural network to the input image matrix to recognize features of the image and predicts coordinates of possible shapes. The machine learning model determines a probability for each of the possible shapes and generates a design label for a design (e.g. a square, a square with a line extending from the center of the square, a square with circle inside of the square) corresponding to a particular possible shape having a highest probability of the set of possible shapes. The machine learning model, in accordance with model dimensions associated with the design label, provides design coordinates which indicate the intended dimensions, orientation, or other features of the design intended by the user from the matrix representation. The machine learning model provides an output comprising the design coordinates.

At block 250, the method 200 involves the user computing device 110 generating, via the machine learning component 112, design coordinates comprising the intended design. In an example, the intended design comprises intended design coordinates comprising one or more points, one or more dimensions, one or more angles, or other relevant coordinate information. For example, intended design coordinates for a circle could be a center point and a radius. Intended design coordinates for a square could be a distance between two opposite corner vertices, a distance between two vertices indicating a length of a side of the square, or other relevant coordinate information. In certain examples, the machine learning component 112 resizes the intended design. For example, if a size of the representation of the user 101 gesture input was proportionally decreased by a particular ratio before being input to the machine learning model, the machine learning component 112 proportionally increases a size of the outputted intended design by the particular ratio. The intended design coordinates enable the application 111 to determine a user interface 113 input corresponding to the user 101 gesture input by mapping the intended design coordinates to the user interface 113.

In certain embodiments, the application 111, using the machine learning model, generates design coordinates for all possible shapes as described in step 250, determines an affinity score for each respective set of possible design coordinates (associated with each respective shape) as described in step 240, and then outputs the intended design coordinates associated with a highest affinity score.

At block 260, the method 200 involves the user computing device 110 mapping, via the application 111 based on the design coordinates, the intended design to the user interface 113 to determine a user interface input. For example, the user 101 was viewing the three-dimensional virtual space when the user 101 executed the one or more gesture inputs. The application 111 determines a user interface input by determining where on the user interface 113 the intended design would have been drawn. In an example, the application 111 compares the intended design coordinates to the previously received user 101 gesture input and maps the intended design to a location on the user interface 113 where the previously received user 101 gesture was input. In an example, the user computing device 110 determines a center location of the user 101 gesture input on the user interface 113 and maps the user interface input to the same center location on the user interface 113.

At block 270, the method 200 involves the user computing device 110 executing, via the application 111, an operation corresponding to the intended user interface 113 input with respect to the three-dimensional virtual space. In an example, the user computing device 110 executes the user interface 113 input with respect to the displayed three-dimensional virtual space as if input directly by the user 101 instead of the one or more gesture inputs received via the user interface 113. In an example, the application 111 accesses a database comprising operations corresponding to user interface 113 inputs. For example, the database comprises a table or other data structure that stores one or more operations corresponding to one or more respective user interface 113 inputs.

Examples of operations include generating an object (e.g. a cube, a pyramid, a cylinder, etc.)) in the virtual three-dimensional space, generating a pre-configured object (e.g. a door, a window, a tree, etc.) in the virtual three-dimensional space, and modifying one or more features of an object in the virtual three-dimensional space. The operation may include applying one or more features to a generated object (e.g. dimensions, orientation, rotation, color, a position in the three-dimensional virtual space, etc.). In an example, an operation is selected based on one or more aspects of the user interface 113 input. In an example, a particular component of the user interface 113 input indicates a modification of one or more features of the generated object. For example, a line extending from a center of a drawn shape (e.g. a circle) indicates a three dimensional form of the shape (e.g. a cylinder) with a height corresponding to a length of the line. For example, a shorter line indicates a smaller height and a longer line indicates a longer height.

In an example, the application 111 determines an operation based on the user interface 113 input and the location of the user interface 113 input with respect to other objects in the virtual three-dimensional space. The operation may include adding the object to the virtual three-dimensional space relative to another object in the three-dimensional space. For example, if the user interface 113 input is within a threshold distance of a surface of an existing object, the operation includes positioning an object attached to (e.g. on top of, under, attached to a side of) or within a surface of the existing object. For example, the user interface 113 input corresponds to an operation to add a door and the location of the user interface 113 input is within a threshold distance to a wall object in the three-dimensional virtual space. In this example, the operation includes inserting the door object within a surface of the wall object. In another example, the user interface 113 input corresponds to an operation to add a cube and the location of the user interface 113 input is within a threshold distance to a top surface of a cylinder object in the three-dimensional virtual space. In this example, the operation includes inserting the cube object on top of the surface of the cylinder object.

At block 280, the method 200 involves the user computing device 110 rendering, via the application 111, an updated three-dimensional virtual space for display via the user interface 113. For example, the user computing device 110 generates the object corresponding to the user interface 113 input in the virtual three-dimensional space and displays the three-dimensional virtual space via the user interface 113 including the generated object. For example, the user 101 inputted the one or more gesture inputs and then views the rendered updated three-dimensional virtual space including the generated object.

Figure 3:
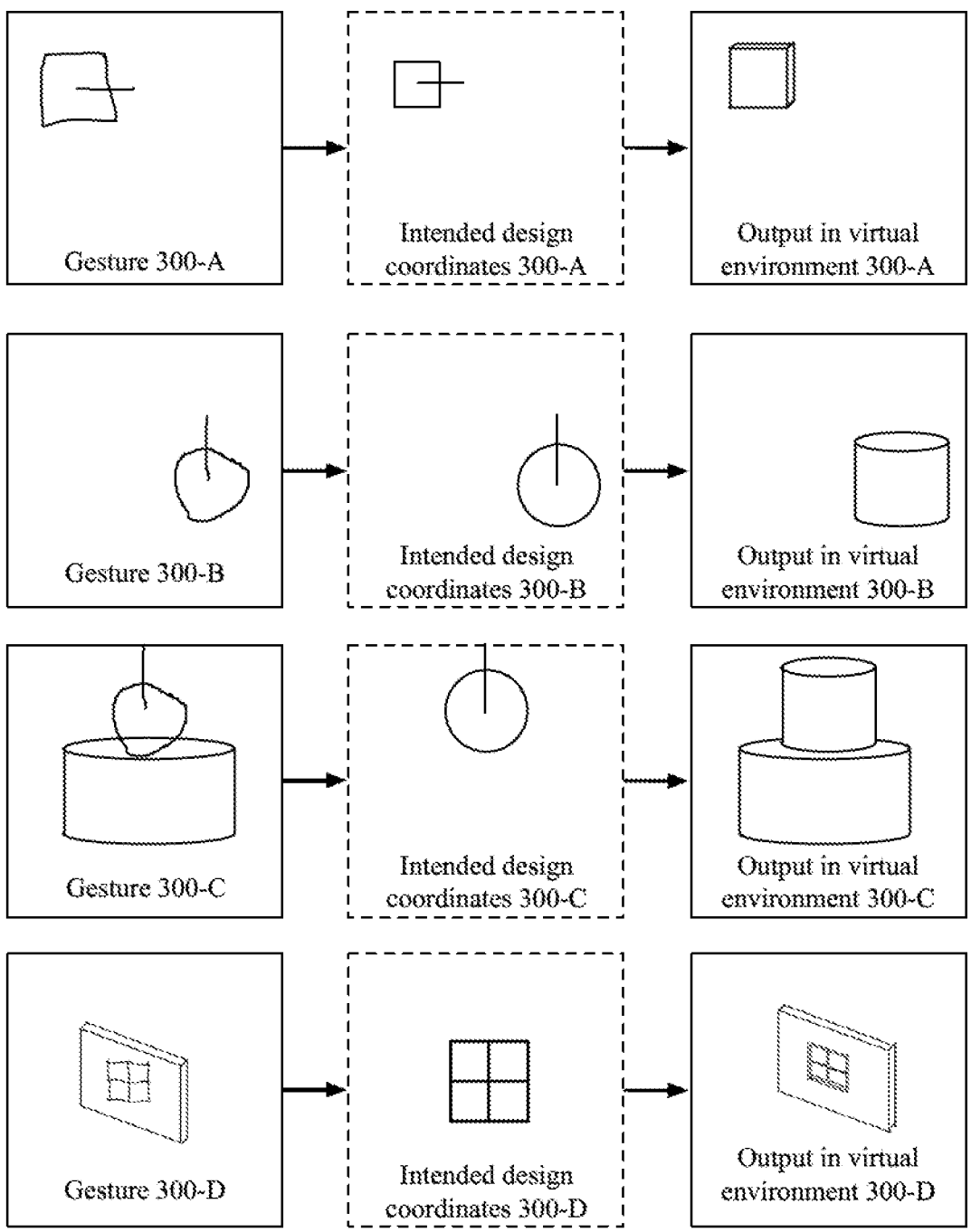
FIG. 3 depicts illustrations of examples of user interface gestures, intended design coordinates interpreted from the user interface gestures, and objects added to a three-dimensional virtual space via user interface input derived from the intended design coordinates, according to certain embodiments described in the present disclosure.

FIG. 3 depicts illustrations of examples of user interface 113 gestures, intended design coordinates interpreted from the user interface gestures, and objects added to a three-dimensional virtual space via user interface 113 input derived from the intended design coordinates. FIG. 3 illustrates four example user 101 gesture inputs (gestures 300-A, 300-B, 300-C, 300-D) as well as respective intended design coordinates (intended design coordinates 301-A, 301-B, 301-C, and 301-D) output by a machine learning model based on the gesture inputs and respective virtual three-dimensional space outputs (outputs in virtual environment 302-A, 302-B, 302-C, and 302-D) resulting from operations performed in response to respective user interface 113 inputs derived from the respective intended design coordinates. The illustrations of intended design coordinates 301-A, 301-B, 301-C, 301-D are conceptual illustrations of design coordinates. Intended design coordinates (e.g. 301-A, 301-B, 301-C, 301-D) may be computer code representations of intended designs, indications of one or more features of intended designs (e.g. a shape identifier, a radius, one or more dimension values), pixel maps or matrix representations of intended designs, or other appropriate information enabling the application 111 to map intended designs to the user interface 113 to generate user interface 113 inputs.

In an example, a user 101 desires to draw a cube in a region of the three-dimensional space displayed via the user interface 113. To instruct the application 111 to draw the cube, the user 101 inputs a gesture by drawing a square and then drawing a line from the center of the square extending out from the square, as shown in gesture 300-A. As shown in gesture 300-A, the user 101 may not input a geometrically correct square, may not draw a straight line extending from the square, and may not draw the line extending exactly from the center of the square. Accordingly, the user 101 may not practically execute a gesture 300-A in accordance with an intended design of the user 101 and the application 113 predicts, using the machine learning component 112, intended design coordinates 300-A corresponding to the intended design of the user 101. For example, the design coordinates 300-A may comprise a length between two opposite corner vertices for the square, a center of the square, an angle from the center to an endpoint of the line segment extending from the square, and a length from the center of the square to the endpoint of the line segment. As shown in intended design coordinates 300-A (which conceptually depicts the design coordinates), the machine learning component 112 determines, based on the actual gesture 300-A input received via the user interface 113, that the user 101 intended to draw a geometrically correct square with a line extending from the center of the square. In this example, the application 111 generates a user interface 113 input by mapping the intended design coordinates 300-A to the user interface and then generates output in virtual environment 300-A in response to the user interface 113 input. The output in virtual environment 300-A comprises a cube displayed in the three-dimensional virtual space.

In another example, a user 101 desires to draw a cylinder in a region of the three-dimensional space displayed via the user interface 113. To instruct the application 111 to draw the cylinder, the user 101 inputs a gesture by drawing a circle and then drawing a line from the center of the circle extending out from the circle vertically, as shown in gesture 300-B. As shown in gesture 300-B, the user 101 may not input a geometrically correct circle. Accordingly, the user 101 may not practically execute a gesture 300-B in accordance with an intended design of the user 101 and the application 113 predicts, using the machine learning component 112, intended design coordinates 300-B corresponding to the intended design of the user 101. As shown in intended design coordinates 300-B (which conceptually represents the design coordinates), the machine learning component 112 determines, based on the actual gesture 300-B input received via the user interface 113, that the user 101 intended to draw a geometrically correct circle with a line extending from the center of the circle. For example, the design coordinates 300-B may comprise a center of the circle, a radius of the circle, an angle of the line segment with the center of the circle, and a length of the line segment. In this example, the application 111 generates a user interface 113 input by mapping the intended design coordinates 300-B to the user interface and then generates output in virtual environment 300-B in response to the user interface 113 input. The output in virtual environment 300-B comprises a cylinder displayed in the three-dimensional virtual space.

In another example, a user 101 views a first cylinder displayed via a user interface 113 and desires to draw a second cylinder on top of the first displayed cylinder in a region of the three-dimensional space. To instruct the application 111 to draw the second cylinder, the user 101 inputs a gesture by drawing, in the user interface 113 near a top surface of the displayed first cylinder, a circle and then drawing a line from the center of the circle extending vertically from the circle, as shown in gesture 300-C. As shown in gesture 300-C, the user 101 may not input a geometrically correct circle. Accordingly, the user 101 may not practically execute a gesture 300-C in accordance with an intended design of the user 101 and the application 113 predicts, using the machine learning component 112, intended design coordinates 300-C corresponding to the intended design of the user 101. As shown in intended design coordinates 300-C (which conceptually represents the design coordinates), the machine learning component 112 determines, based on the actual gesture 300-C input received via the user interface 113, that the user 101 intended to draw a geometrically correct square with a line extending from the center of the square. For example, the design coordinates 300-C may comprise a center of the circle, a radius of the circle, an angle of the line segment from the center, and a length of the line segment In this example, the application 111 generates a user interface 113 input by mapping the intended design coordinates 300-C to the user interface and then generates output in virtual environment 300-C in response to the user interface 113 input. The output in virtual environment 300-C comprises a second cylinder displayed on top of a surface of the displayed cylinder in the three-dimensional virtual space.

In yet another example, a user 101 desires to draw a window object in a region of the three-dimensional space displayed via the user interface 113. To instruct the application 111 to draw the window object, the user 101 inputs a gesture by drawing a square with an cross design intersecting at the center of the square extending to the midpoints of the sides the square, as shown in gesture 300-D. As shown in gesture 300-D, the user 101 may not input a geometrically correct square, may not draw the cross design over the square that perfectly aligns with the center of the box, and the edges of the cross design may extend past the sides of the square. Accordingly, the user 101 may not practically execute a gesture 300-D in accordance with an intended design of the user 101 and the application 113 predicts, using the machine learning component 112, intended design coordinates 300-D corresponding to the intended design of the user 101. As shown in intended design coordinates 300-D (which conceptually represents the design coordinates), the machine learning component 112 determines, based on the actual gesture 300-D input received via the user interface 113, that the user 101 intended to draw a geometrically correct square with a cross design intersecting at the center of the square extending to the midpoints of the sides of the square. For example, the design coordinates 300-D may comprise a center of the square, a length between the center of the square and a midpoint of a side of the square, and an identifier that indicates that two line segments connect the opposite midpoints of the square and intersect with the center. In this example, the application 111 generates a user interface 113 input by mapping the intended design coordinates 300-D to the user interface and then generates output in virtual environment 300-D in response to the user interface 113 input. The output in virtual environment 300-D comprises a window object displayed in the three-dimensional virtual space.

Example of a Computing System for Implementing Certain Embodiments

Figure 4:
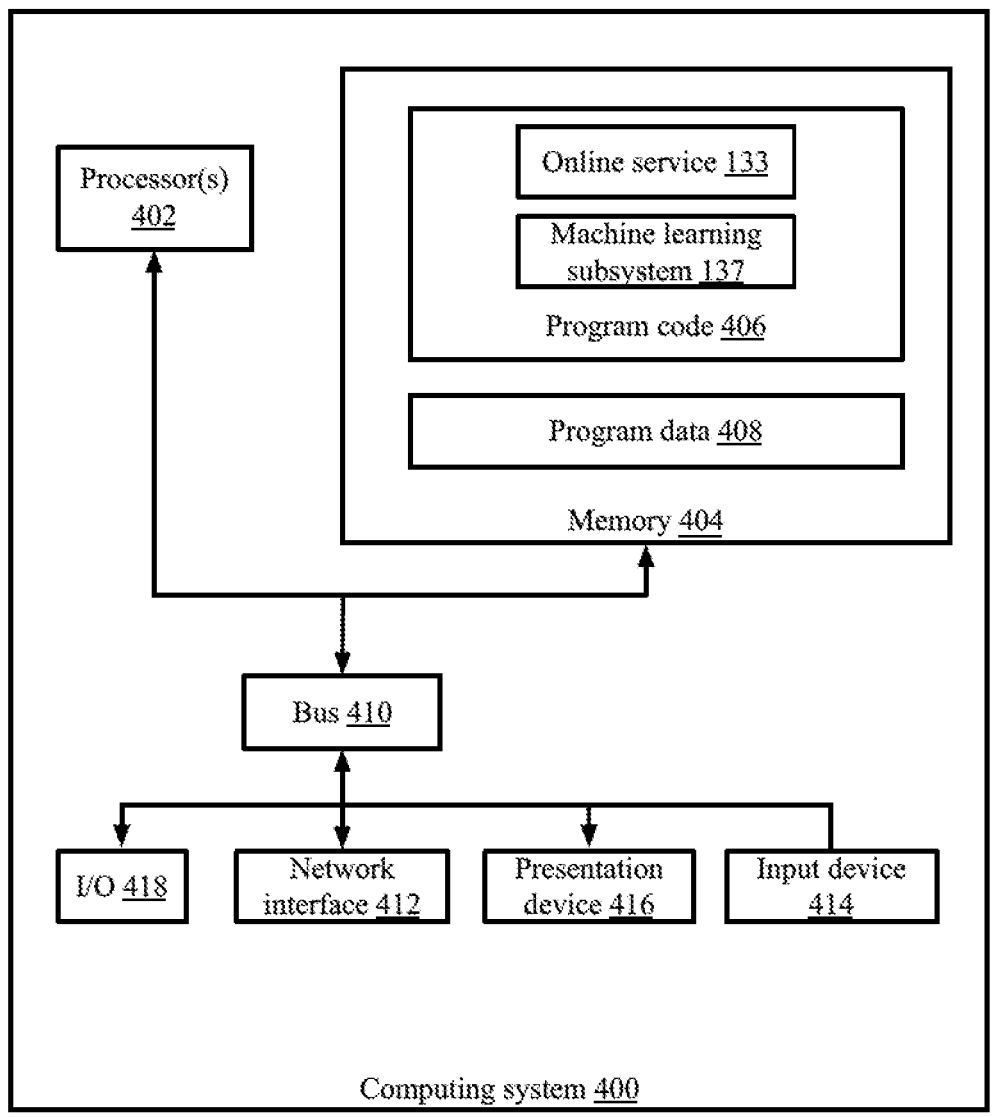
FIG. 4 depicts an example of a computing system that performs certain operations described herein, according to certain embodiments described in the present disclosure.

Any suitable computing system or group of computing systems can be used for performing the operations described herein. For example, FIG. 4 depicts an example of a computing system 400. The computing system 400 includes the computing system 130.

The depicted examples of a computing system 400 includes a processor 402 communicatively coupled to one or more memory devices 404. The processor 402 executes computer-executable program code stored in a memory device 404, accesses information stored in the memory device 404, or both. Examples of the processor 402 include a microprocessor, an application-specific integrated circuit ("ASIC"), a field-programmable gate array ("FPGA"), or any other suitable processing device. The processor 402 can include any number of processing devices, including a single processing device.

The memory device 404 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions.

The computing system 400 executes program code 406 that configures the processor 402 to perform one or more of the operations described herein. The program code 406 includes, for example, the online service 133, the machine learning subsystem 137, or other suitable applications that perform one or more operations described herein. The program code 406 may be resident in the memory device 404 or any suitable computer-readable medium and may be executed by the processor 402 or any other suitable processor. The program code could include processor-specific instructions generated by a compiler or an interpreter from code written in any suitable computer-programming language, including, for example, C, C++, C#, Visual Basic, Java, Python, Perl, JavaScript, and ActionScript.

In some embodiments, program code 406 for implementing both the online service 133 and the machine learning subsystem 137 are stored in the memory device 404, as depicted in FIG. 4. In additional or alternative embodiments, program code 406 for implementing one or more of the online service 133 and the machine learning subsystem 137 are stored in different memory devices of different computing systems. In additional or alternative embodiments, the program code 406 described above is stored in one or more other memory devices accessible via a data network.

The computing system 400 can access program data 407, which includes one or more of the datasets described herein (e.g., diagnostic data, status data of system components 131), in any suitable manner. In some embodiments, some or all of one or more of these data sets, models, and functions are stored as the program data 407 in the memory device 404, as in the example depicted in FIG. 4. In additional or alternative embodiments, one or more of these data sets, models, and functions are stored in the same memory device (e.g., one of the memory device 404). For example, a common computing system, such as the computing system 130 depicted in FIG. 1, can hardware, software, or both that implements the online service 133 and the machine learning subsystem 137. In additional or alternative embodiments, one or more of the programs, data sets, models, and functions described herein are stored in one or more other memory devices accessible via a data network.

The computing system 400 also includes a network interface device 412. The network interface device 412 includes any device or group of devices suitable for establishing a wired or wireless data connection to one or more data networks. Non-limiting examples of the network interface device 412 include an Ethernet network adapter, a modem, and the like. The computing system 400 is able to communicate with one or more other computing devices (e.g., computing device associated with user computing devices 110) via a data network using the network interface device 410.

The computing system 400 may also include a number of external or internal devices, such as input or output devices. For example, the computing system 400 is shown with one or more input/output ("I/O") interfaces 418. An I/O interface 418 can receive input from input devices or provide output to output devices. One or more buses 410 are also included in the computing system 400. The bus 410 communicatively couples one or more components of a respective one of the computing system 400.

In some embodiments, the computing system 400 also includes the input device 414 and the presentation device 416 depicted in FIG. 4. An input device 414 can include any device or group of devices suitable for receiving visual, auditory, or other suitable input that controls or affects the operations of the processor 402. Non-limiting examples of the input device 414 include a touchscreen, a mouse, a keyboard, a microphone, a separate mobile computing device, etc. A presentation device 416 can include any device or group of devices suitable for providing visual, auditory, or other suitable sensory output. Non-limiting examples of the presentation device 416 include a touchscreen, a monitor, a speaker, a separate mobile computing device, etc.

Although FIG. 4 depicts the input device 414 and the presentation device 416 as being local to the computing device that executes the program code 406, other implementations are possible. For instance, in some embodiments, one or more of the input device 414 and the presentation device 416 can include a remote client-computing device that communicates with the computing system 400 via the network interface device 412 using one or more data networks described herein.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 5:
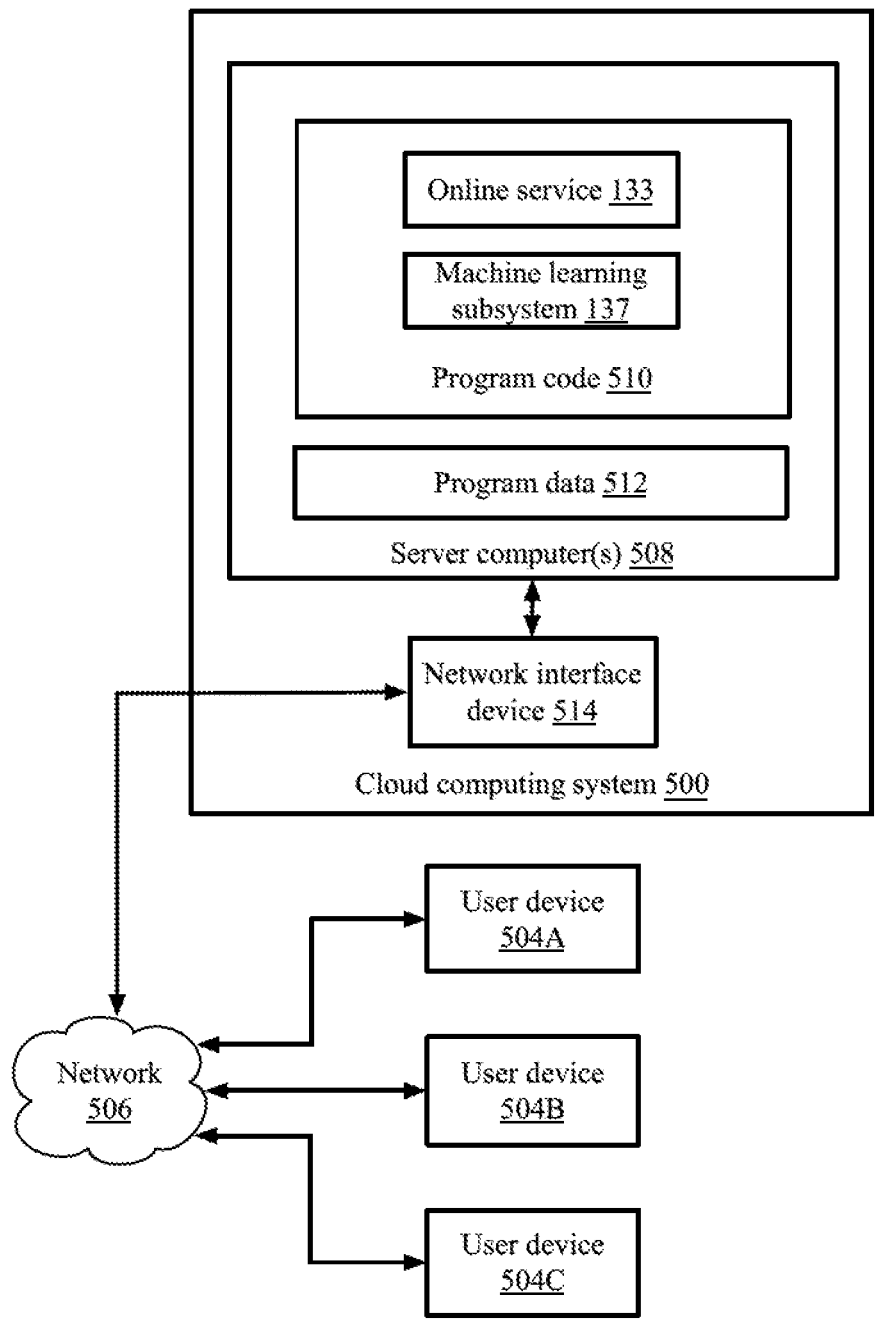
FIG. 5 depicts an example of a cloud computing system that performs certain operations described herein, according to certain embodiments described in the present disclosure.

In some embodiments, the functionality provided by computer system 400 may be offered as cloud services by a cloud service provider. For example, FIG. 5 depicts an example of a cloud computer system 500 offering an online service 133 that can be used by a number of user subscribers using user devices 504A, 504B, and 504C across a data network 506. In the example, the online service 133 may be offered under a Software as a Service (SaaS) model. One or more users may subscribe to the next event prediction and dynamic clustering service, and the cloud computer system 500 performs the online service 133 to subscribers. For example, the cloud computer system 500 performs services comprising one or more of steps or functions illustrated in blocks 210-280 of FIG. 2 and described herein. The cloud computer system 500 may include one or more remote server computers 508.

The remote server computers 508 include any suitable non-transitory computer-readable medium for storing program code 510 (e.g. online service 133 and machine learning subsystem 137) and program data 512, or both, which is used by the cloud computer system 500 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 508 can include volatile memory, non-volatile memory, or a combination thereof.

One or more of the server computers 508 execute the program code 510 that configures one or more processors of the server computers 508 to perform one or more of the operations that provide one or more methods described herein (e.g. the methods of blocks 210-280 of FIG. 2 described herein). As depicted in the embodiment in FIG. 5, the one or more servers may implement online service 133 and the machine learning subsystem 137. Any other suitable systems or subsystems that perform one or more operations described herein (e.g., one or more development systems for configuring an interactive user interface) can also be implemented by the cloud computer system 500.

In certain embodiments, the cloud computer system 500 may implement the services by executing program code and/or using program data 512, which may be resident in a memory device of the server computers 508 or any suitable computer-readable medium and may be executed by the processors of the server computers 508 or any other suitable processor.

In some embodiments, the program data 512 includes one or more datasets and models described herein. Examples of these datasets include training data. In some embodiments, one or more of data sets, models, and functions are stored in the same memory device. In additional or alternative embodiments, one or more of the programs, data sets, models, and functions described herein are stored in different memory devices accessible via the data network 506.

The cloud computer system 500 also includes a network interface device 514 that enables communications to and from cloud computer system 500. In certain embodiments, the network interface device 514 includes any device or group of devices suitable for establishing a wired or wireless data connection to the data networks 506. Non-limiting examples of the network interface device 514 include an Ethernet network adapter, a modem, and/or the like. The next event prediction and dynamic clustering service is able to communicate with the user devices 504A, 504B, and 504C via the data network 506 using the network interface device 514.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A computer-implemented method, comprising:
using a user computing device:
displaying, via a user interface, a three-dimensional OD) virtual space and a first 3D object within the 3D virtual space;
detecting a gesture input at a location of the user interface comprising physical contacts at the user interface;
translating the gesture input into a single user interface input for generating a second 3D object in the 3D virtual space by:
generating a two-dimensional (2D) representation of the gesture input comprising a 2D representation of the physical contacts detected at the user interface;
applying a machine learning model to the 2D representation of the gesture input to output a predicted design for the gesture input, wherein the machine learning model determines, for each candidate design of a set of candidate designs, an affinity score representing a probability that the candidate design corresponds to the 2D representation of the gesture input, wherein the predicted design corresponds to a particular candidate design of the set of candidate designs having a greatest determined affinity score,
wherein the predicted design for the gesture input includes design coordinates defining a 2D shape and a line extending from within boundaries of the 2D shape;
generating the single user interface input by mapping the predicted design for the gesture input to the and the location of the gesture input on the user interface, wherein mapping the predicted design to the user interface comprises mapping the predicted design to the user interface based on the design coordinates;
executing, based on the single user interface input comprising the predicted design mapped to the location of the user interface and based on determining that the location of the gesture input is within a threshold distance to a surface of the displayed first 3D object, an operation to add the second 3D object in the 3D virtual space attached to or within the surface of the displayed first 3D object, wherein a length of a first dimension of the second 3D object corresponds to a length of the line;
rendering an updated 3D virtual space displaying the displayed first 3D object and the second 3D object attached to or within the surface of the displayed first 3D object.

2. The computer-implemented method of claim 1, wherein the design coordinates comprise size information and orientation information, wherein the user computing device uses the location of the gesture input, the size information, and the orientation information to map the predicted design to the user interface to generate the single user interface input.

3. The computer-implemented method of claim 1, further comprising:
determining dimensions of the predicted design in the 3D virtual space, wherein a second dimension and a third dimension of the second 3D object is based on dimensions of the boundaries of the 2D shape.

4. The computer-implemented method of claim 1, wherein dimensions of the second 3D object are determined based on dimensions of one or more particular components of the predicted design.

5. The computer-implemented method of claim 1, wherein the user interface comprises a touch screen interface and wherein the physical contacts comprise one or more touch inputs to the touch screen interface.

6. The computer-implemented method of claim 1, further comprising, by the user computing device:
retrieving the second 3D object from an object database, the second 3D object corresponding to the single user interface input.

7. A non-transitory computer-readable storage medium comprising computer-executable instructions that when executed by a processor cause the processor to:
display, via a user interface, a three-dimensional (3D) virtual space and a first 3D object within the 3D virtual space;
detect a gesture input at a location of the user interface comprising physical contacts at the user interface;
translate the gesture input into a single user interface input for generating a second 3D object in the 3D virtual space by:
generating a two-dimensional (2D) representation of the gesture input comprising a 2D representation of the physical contacts detected at the user interface;
applying a machine learning model to the 2D representation of the gesture input to output a predicted design for the gesture input, wherein the machine learning model determines, for each candidate design of a set of candidate designs, an affinity score representing a probability that the candidate design corresponds to the 2D representation of the gesture input, wherein the predicted design corresponds to a particular candidate design of the set of candidate designs having a greatest determined affinity score,
wherein the predicted design for the gesture input includes design coordinates defining a 2D shape and a line extending from within boundaries of the 2D shape;
generating the single user interface input by mapping the predicted design for the gesture input to the location of the gesture input on the user interface, wherein mapping the predicted design to the user interface comprises mapping the predicted design to the location of the user interface based on the design coordinates;
executing, based on the single user interface input comprising the predicted design mapped to the location of the user interface and based on determining that the location of the gesture input is within a threshold distance to a surface of the displayed first 3D object, an operation to add the second 3D object in the 3D virtual space attached to or within the surface of the displayed first 3D object, wherein a length of a first dimension of the second 3D object corresponds to a length of the line;
rendering an updated 3D virtual space displaying the displayed first 3D object and the second 3D object attached to or within the surface of the displayed first 3D object.

8. The non-transitory computer-readable storage medium of claim 7, wherein the design coordinates comprise size information and orientation information, wherein the user computing device uses the location of the gesture input, the size information, and the orientation information to map the predicted design to the user interface to generate the single user interface input.

9. The non-transitory computer-readable storage medium of claim 7, wherein the non-transitory computer-readable storage medium further comprises computer-executable instructions that when executed by the processor cause the processor to:
determine, from the dimensions of the predicted design in the 3D virtual space, wherein a second dimension and a third dimension of the second 3D object is based on dimensions of the boundaries of the 2D shape.

10. The non-transitory computer-readable medium of claim 9, wherein dimensions of the second 3D object are determined based on one or more particular components of the predicted design.

11. The non-transitory computer-readable medium of claim 7, wherein the user interface comprises a touch screen interface and wherein the physical contacts comprise one or more touch inputs to the touch screen interface.

12. A system, comprising:
one or more processors; and
a non-transitory computer-readable storage medium comprising computer-executable instructions that, when executed by the processor, cause the system to:
detect a gesture input at a location of a user interface, the gesture input comprising physical contacts detected at the user interface;
translate the gesture input into a single user interface input for generating a second three-dimensional (3D) object in a 3D virtual space displaying a first 3D object by:
generating a two-dimensional (2D) representation of the gesture input comprising a 2D representation of the physical contacts detected at the user interface;
applying a machine learning model to the 2D representation of the gesture input to output a predicted design for the gesture input, wherein the machine learning model determines, for each candidate design of a set of candidate designs, an affinity score representing a probability that the candidate design corresponds to the 2D representation of the gesture input, wherein the predicted design corresponds to a particular candidate design of the set of candidate designs having a greatest determined affinity score,
wherein the predicted design for the gesture input includes design coordinates defining a 2D shape and a line extending from within boundaries of the 2D shape; and
generating the single user interface input by mapping the predicted design for the gesture input to the location of the gesture input on the user interface, wherein mapping the predicted design to the user interface comprises mapping the predicted design to the user interface based on the design coordinates; and
execute, based on the single user interface input comprising the predicted design mapped to the location of the user interface and based on determining that the location of the gesture input is within a threshold distance to a surface of the displayed first 3D object, an operation to add the second 3D object in the 3D virtual space attached to or within the surface of the displayed first 3D object, wherein a length of a first dimension of the second 3D object corresponds to a length of the line.

13. The system of claim 12, wherein the design coordinates comprise size information and orientation information, wherein the user computing device uses the location of the gesture input, the size information, and the orientation information to map the predicted design to the user interface to generate the single user interface input.

14. The system of claim 12, wherein the non-transitory computer-readable storage medium further comprises instructions that when executed by the processor cause the system to:
display the 3D virtual space via the user interface;
determine, from the user interface input, dimensions of the predicted design in the 3D virtual space, wherein a second dimension and a third dimension of the second 3D object are determined based on dimensions of the boundaries of the 2D shape.

15. The system of claim 12, wherein dimensions of the second 3D object are determined based on one or more particular components of the predicted design.

16. The system of claim 12, wherein the user interface comprises a touch screen interface and wherein the physical contacts comprise one or more touch inputs to the touch screen interface.

17. The system of claim 12, wherein the non-transitory computer-readable storage medium further comprises instructions that when executed by the processor cause the system to retrieve the second 3D object from an object database, the second 3D three-dimensional object corresponding to the single user interface input.

* * * * *